June 29, 1954     P. L. BLUM     2,682,285
MACHINE FOR PERFORMING A CIRCULAR SAWING OPERATION
Filed May 9, 1950     3 Sheets-Sheet 1
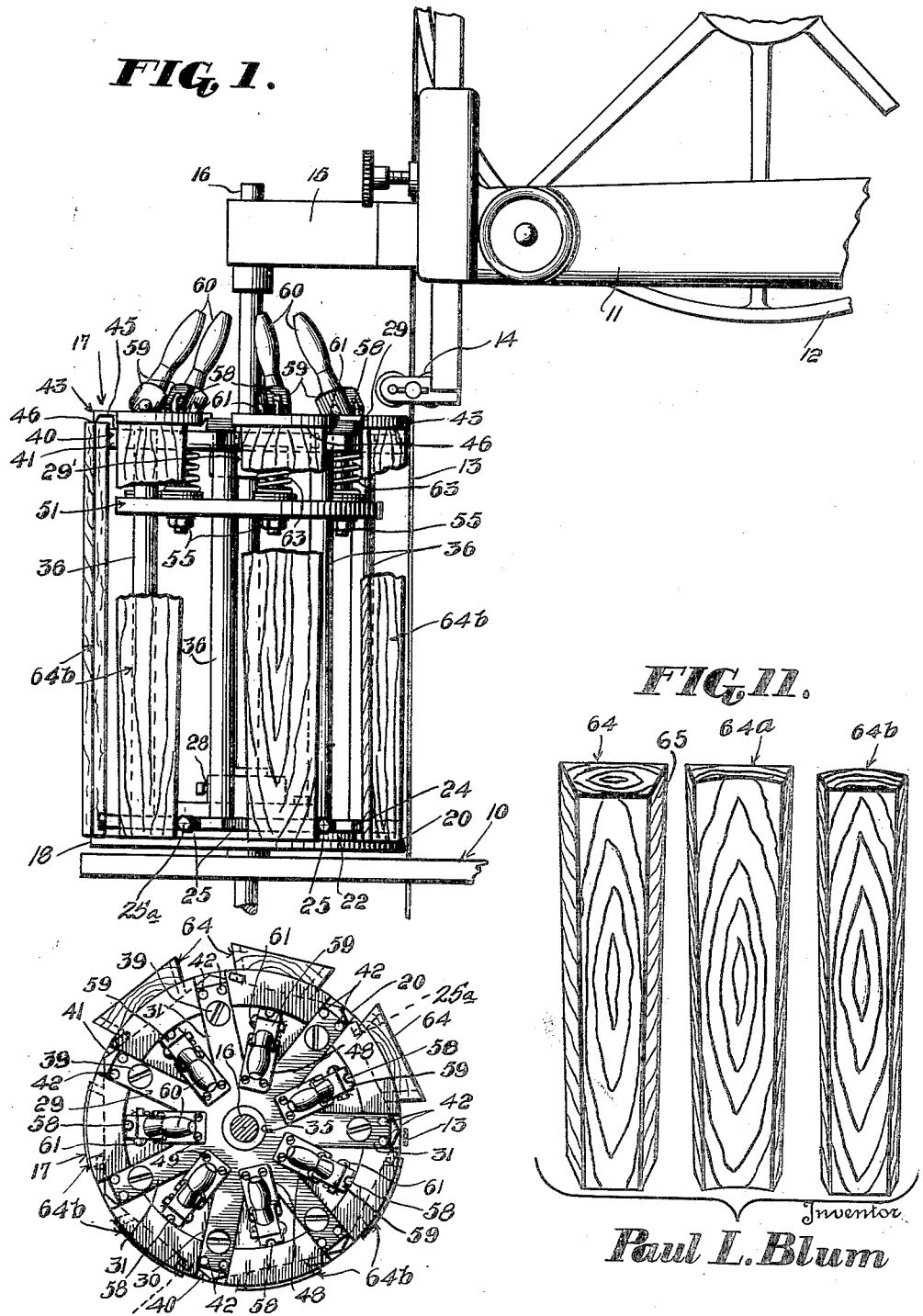

June 29, 1954     P. L. BLUM     2,682,285
MACHINE FOR PERFORMING A CIRCULAR SAWING OPERATION
Filed May 9, 1950     3 Sheets-Sheet 2
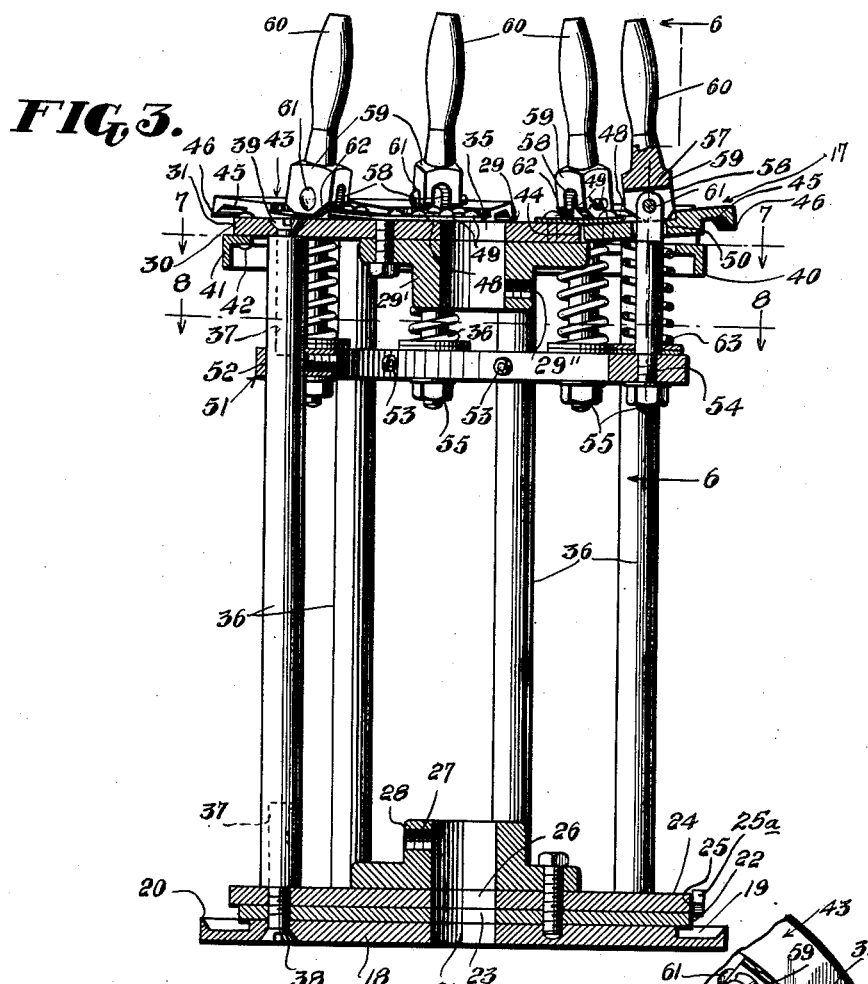
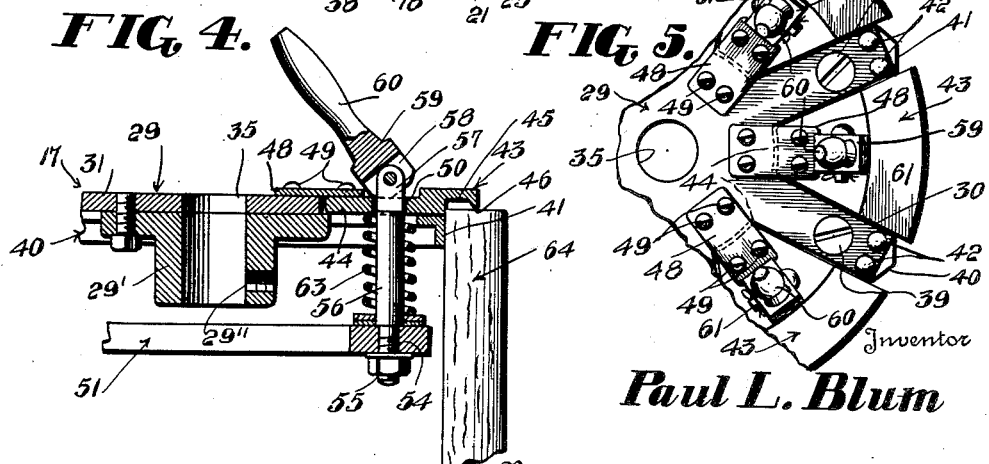
Inventor
Paul L. Blum
By Wilfred E. Lawson
Attorney

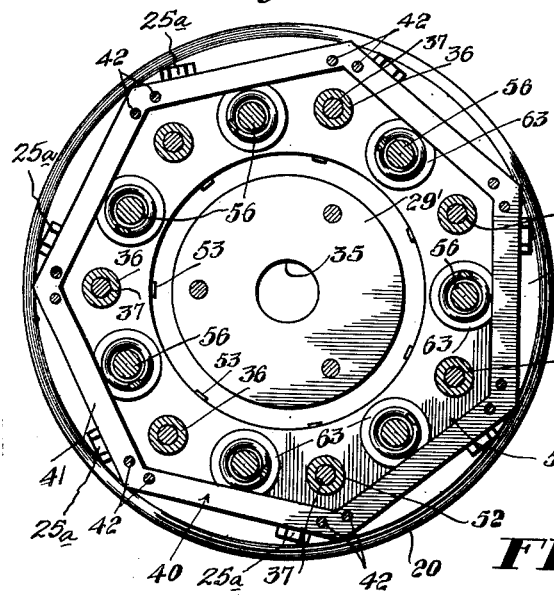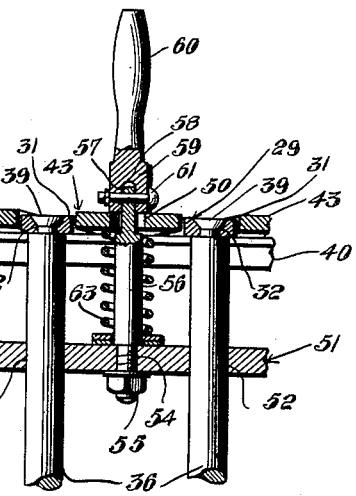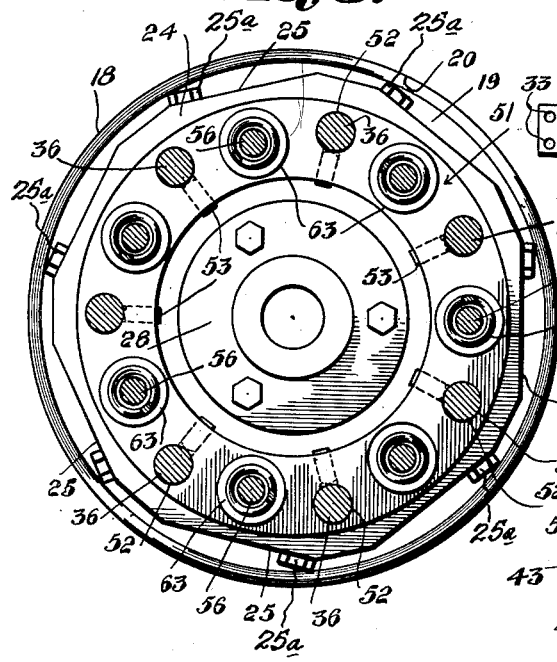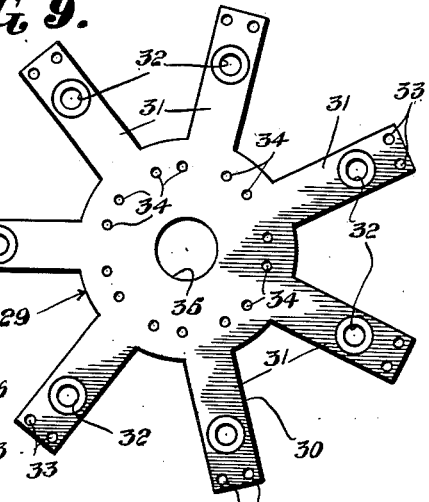

Patented June 29, 1954

2,682,285

UNITED STATES PATENT OFFICE 2,682,285

MACHINE FOR PERFORMING A CIRCULAR SAWING OPERATION

Paul L. Blum, Marshfield, Wis., assignor to Blum Bros. Box Company, Marshfield, Wis., a corporation of Wisconsin Application May 9, 1950, Serial No. 160,905

4 Claims. (Cl. 143—26)

This invention relates generally to improvements in wood working or wood sawing machines and is directed particularly to an improved machine for performing a circular sawing operation.

The machine of the present invention is designed primarily for use in connection with the making of staves such as are employed in the manufacture of tubs and pails and it has for its primary object to provide an apparatus for use in association with a band saw, which will support on end a piece of material from which a pair of tub or bucket staves are to be produced, and saw or cut the piece lengthwise along an arcuate or curved path to produce two pieces each having one face of the proper transverse curvature for a stave, the opposite face of the piece being subsequently operated upon by another machine to give the desired transverse curvature to such other face.

In my co-pending application Serial No. 160,904, filed May 9, 1950, now Patent No. 2,673,585, I have set forth a novel method for employing mill waste pieces of suitable length for the manufacture of staves for tubs and pails wherein such pieces are joined or glued together in edge to edge relation to form a substantially rectangular blank having a length greater than the desired finished stave and having a width greater than the combined widths of a number of the completed staves, after which said blank is subjected to a sawing operation in a novel manner whereby there are produced stave pieces having the proper longitudinal taper and the proper edge bevel for the completed staves. These stave pieces are of such thickness that two completed staves may be produced therefrom and the machine of the present invention is designed to facilitate the sawing of such stave piece lengthwise along an arcuate path lying between the inner and outer faces of the piece and cutting through the beveled side edges of the piece, thereby producing two incomplete staves, each of which has one face finished to the proper transverse curvature and having the proper longitudinal taper and longitudinal edge bevel.

A further object of the invention is to provide an attachment for a band saw machine, in which a number of the above described stave pieces may be clamped in vertical position and moved through an arcuate path relative to the band saw whereby to saw the stave piece in the manner stated.

A still further object of the invention is to provide a band saw attachment of the character stated, comprising a vertically disposed rotatable cylindrical frame having cooperating top and bottom jaws between which a stave piece may be secured, the upper jaws being spring actuated to opened position and forced into closing position by a hand lever, the construction of the device being such that the jaws engage the top and bottom edges of the stave pieces along a line positioned inwardly from the stave piece whereby such piece can be moved edgewise toward the cutting edge of a band saw which will saw the piece into two sections lengthwise and on a transversely arcuate path.

Other objects and advantages of the invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawings:

Figure 1 is a view in side elevation of the band saw attachment of the present invention, showing the same in working position on a band saw table and showing a number of stave pieces in the machine, certain of such pieces being broken away.

Figure 2 is a view in top plan of the device as shown in Figure 1, the shaft for the same being in transverse section.

Figure 3 is a central vertical section through the device.

Figure 4 is a fragmentary sectional detail showing a jaw in clamping position.

Figure 5 is a fragmentary top plan of the device showing the spring actuated jaws on an enlarged scale.

Figure 6 is a vertical section taken substantially on the line 6—6 of Figure 3.

Figure 7 is a horizontal transverse section taken substantially on the line 7—7 of Figure 3.

Figure 8 is a horizontal transverse section taken substantially on the line 8—8 of Figure 3.

Figure 9 is a plan view of the top plate carrying the jaws.

Figure 10 is a detailed perspective of one jaw.

Figure 11 (Sheet 1) is a view showing in perspective a stave piece before being divided and two incomplete staves as produced from the stave piece after the same has been cut by the band saw.

Referring more particularly to the drawings the numeral 10 generally designates the work supporting table of a conventional type of band saw, the upper arm of which is designated 11 while the top wheel around which the band saw is trained is designated 12, a portion only of this wheel being illustrated.

The numeral 13 designates a portion of the band saw and the numeral 14 designates the saw guides which are carried at the forward end of the machine arm 11.

For the support and operation of the stave piece carrying device of the present invention, the table 10 is constructed to extend forwardly a substantial distance and the machine arm 11 has secured to the forward end thereof a bearing bracket 15 in the outer end of which is engaged the upper end of a vertical shaft 16. This shaft extends downwardly through the table 10 and may be connected with any suitable power means by which it is rotated.

The stave piece carrying device of the present invention comprises an upright cylindrical structure generally designated 17, which is positioned uprightly upon the work table 10 and has the shaft 16 extending axially therethrough and secured thereto, to effect the rotation of the device.

As best seen in Figure 3, the device comprises a bottom or base plate 18 of circular form, having a relatively wide channel cut in the top face thereof as indicated at 19, which channel follows the outline of the periphery of the plate and has its outer wall inclined upwardly and outwardly to intersect the edge face of the plate, thereby forming an annular knife edge 20 which constitutes a jaw for cooperation with a number of individual jaw members forming a part of the top of the structure as hereinafter set forth.

The base plate 18 has formed centrally therethrough the opening 21 through which the shaft 16 passes.

Placed upon the top of the base plate 18 and concentric therewith is the circular spacer plate 22 having a central opening 23 and upon the top of this is a spacer plate 24 which has a number of straight edge facets 25 against which one side of a stave piece is placed when the piece is being mounted in the machine. This gauge plate 24 is here shown as having seven sides or facets 25 but it will be understood, of course, that it is not limited to this number but may be made with any number desired.

The gauge plate 24 has a central opening 26 which aligns with the openings of the other two plates and mounted upon the top of the gauge plate and concentric with the opening 26 is the shaft collar 27 which is provided with a set screw 28, Figure 1, to secure the device to the shaft 16.

As shown in Figure 3 and also in Figure 8, the facets 25 of the gauge plate are positioned inwardly from the edge of the jaw 20 so that the bottom end of the stave piece will have a firm bearing on the jaw when it is butted against a facet 25 of the gauge plate.

The numeral 29 designates a top or head plate for the machine. This top or head plate is of initial circular contour but has a number of sectors cut therefrom to provide the outwardly directed openings 30 which correspond in number with the facets 25 of the plate 24. See Figure 9. There are thus provided the seven radial arms 31 each of which has formed therethrough adjacent to its outer end, a countersunk screw hole 32 while the outer end of the arm beyond the hole 32 is provided with the two screw holes 33 for the purpose hereinafter set forth.

At the innner end of each triangular space 30 the body of the plate 29 has two screw holes 34 formed therein and the center of the plate has the shaft opening 35.

The top or head plate 29 is maintained in vertical spaced coaxial relation with the bottom plate 18 by the plurality of vertical supporting posts 36, each of which has a tapped opening in each end as indicated at 37 in Figure 3. These posts 36 rest upon the top of the gauge plate 24 and the three plates 18, 22 and 24 are provided with suitable aligned openings to have extended therethrough a number of securing screws 38 each of which threads into a tapped opening 37 of an overlying post.

The top end of each post 36 aligns with a countersunk hole 32 and each of these holes has a screw 39 extended therethrough and threaded into the top end of a post as shown in Figure 3. Thus it will be seen that the top and bottom plates of the device are firmly secured together by supporting posts 36 and these plates are held in concentric relation and the underside of the top plate has bolted thereto a shaft collar 29' provided with a threaded set screw opening 29" to receive a set screw, not shown, which engages the shaft 16.

Disposed against the underside of the top plate 29 is a gauge frame 40. This gauge frame has the same number of sides 41 as the bottom plate 24 has facets and each of the sides of the gauge frame connects or joins together the outer ends of two of the arms 31 of the top plate, being secured thereto by screws or rivets 42 which are secured in the openings 33. See Figure 7. The outer straight face of each of the sides 41 of the gauge frame is disposed in the same vertical plane as a facet 25 and has the inner side of a stave piece placed thereagainst as hereinafter set forth.

Each of the spaces 30 of the top plate 29 has fitted therein a sector jaw plate which is generally designated 43. Such jaw plate is shown in perspective in Figure 10 and as is illustrated in this figure the inner or smaller end of the plate is formed on a transverse curvature 44 to substantially conform to the curvature of the head plate at the inner end of the space 30 in which the jaw is located while at the outer or wider end, the jaw plate has the underface provided with an arcuate recess 45, the outer side of which recess is angled outwardly and downwardly to intersect the front or outer edge face af the plate thereby forming the relatively sharp arcuate jaw edge or blade 46.

The inner end of each jaw plate 43 has the two screw holes 47 therein and, as is shown most clearly in Figures 4 and 5, there is disposed upon the top of each jaw plate at its inner end, one end of a flat spring plate 48, the other end of which plate rests upon the top of the head plate 29 over the two adjacent holes 34. Securing screws 49 pass through the spring plate 48 at the inner and outer ends and engage in the holes 34 and 47 as illustrated.

Forwardly of the spring plate 48, each jaw 43 has an opening 50 formed therethrough for the hereinafter described pull pin.

The numeral 51 generally designates a ring or annulus which is disposed beneath the top plate 29 and which is provided with a plurality of openings 52, through each of which a post 36 passes as shown in Figure 8. From the inside, the ring 51 has threaded in suitable tapped openings, the set screws 53, each of which bears against a post 36 to secure the ring at the desired elevation on the posts.

Midway between the openings 52 which provide for the passage of the post 36 through the ring 51, the ring is provided with the openings 54. See Figure 6. Each of these openings 54 is directly below the opening 50 of an overlying jaw 43 and each has located therein the reduced lower end portion 55 of a pull pin 56 which extends upwardly through the opening 50 of the adjacent plate 43 as is clearly shown in Figures 3, 4 and 6.

The upper end of each pull pin is reduced in thickness from opposite sides to form an ear 57 and this ear positions in a slot 58 which is formed in the enlarged lower end portion 59 of a lever 60. The ear 57 is secured to the part 59 of the lever by a transverse bolt or pin 61, as shown in Figure 6.

The enlarged portion 59 of each lever has an angular shoulder 62 upon its inner side and when the lever 60 is oscillated from the substantially vertical position in which it is shown in Figure 3 to the inwardly inclined position in which it is shown in Figure 4, the shoulder 62 is forced down against the top of the jaw 43 and, the jaw is pushed down to the horizontal position in which it is shown in Figure 4.

Encircling each of the pull pins 56 is an expansion spring 63 which bears at its lower end against the ring 51 while the upper end pushes against the underside of the jaw plate 43. This spring is normally under compression and constantly tends to push the jaw plate 43 upwardly and when the lever 60 is vertical to release the downward thrust against the jaw plate and the jaw plate is raised by the spring 63, the spring hinge plates 48 will be bent or flexed and placed under tension.

It will also be seen upon reference to Figure 4 that when the jaw plate 43 is down it will contact the top of the gauge frame 40 and the arcuate outer edge of the jaw plate or the edge 46 thereof will be directly above and in line with the fixed jaw edge 20 of the bottom plate 18.

As is readily seen in Figures 1 and 2 the stave piece holder when mounted upon the table 10, has the edge or periphery of the plate 18 and of the jaw plates 43, when they are in down or closed position, located close to the band saw 13 so that when the cylinder 17 is rotated on the shaft 16 the stave pieces gripped between the jaws 20 and 43 will be brought against the cutting edge of the saw and cut lengthwise on an arcuate path.

The numeral 64 designates a stave piece from which are formed two incomplete staves. In Figure 11 a complete stave piece is shown, looking toward the inner face of the same and as is clearly seen this piece is longitudinally tapered and has the two longitudinal side edges beveled as at 65 so that when the completed stave is obtained it will have the proper taper and bevel for assembly with other pieces for the making up of a tub or pail. After the stave piece has been set up in the machine and has been cut by the band saw 13 there are obtained the two incomplete staves 64a and 64b, one of which has one face cut to form the concave transverse arc while the other one has one face formed with a transverse convex arc.

In the use of the present machine the operator sets up the stave pieces 64 upon end, on the bottom jaw 20 with the inner face of the stave piece against the facet 25 of the bottom gauge plate. The top end of the stave piece is then swung in against the side 41 of the top gauge frame 40 and this locates the top end edge of the piece beneath the edge 46 of the adjacent top jaw 43.

In order to insure the proper positioning of the stave pieces against the facets 25, or in other words, the placing of the stave pieces always exactly in the same position, so that they will be properly sawed, there is provided a gauge or positioning machine screw head 25a at the right hand end, or corner, of each facet 25 as best shown in Figure 8. This screw head is relatively thin so that it will not project into the path of the saw blade.

When the stave piece is placed on the knife edge 20 it is shifted to the right, if necessary, until it butts against the gauge screw, and the top then moved in as above described.

The lever 60 for the top jaw 43 is then forced back or toward the center of the device which forces the jaw 43 down so as to cause the edge thereof to bite into the top edges of the stave piece as illustrated in Figure 4. The cylinder is then rotated in the proper direction to bring one beveled edge of a stave piece against the cutting edge of the saw and the saw cuts through the piece between the inner and outer faces to produce the two incomplete staves 64a and 64b shown in Figure 11.

The direction of rotation of the stave carrier is clockwise, in Figure 8, with respect to the saw 13, and accordingly it will be apparent that the bolt head against which each stave piece bears, serves to hold the piece against any possible sidewise or slipping movement when it is being fed to the saw.

Further work upon the incompleted staves is performed by a suitable planing machine to shape the remaining flat face of each incomplete stave to the proper curvature as set forth in my copending application hereinbefore referred to.

I claim:

1. A work holding machine of the character set forth comprising a pair of vertically spaced concentric, circular plates, a rotatable supporting shaft passing vertically through the centers of the plates and secured to the same, the lower one of said plates having an upwardly directed edge forming a jaw, the upper plate having a plurality of radially directed recesses opening through its periphery, a sector member in each recess and having its curved edge forming a part of the periphery of the upper plate, means securing each sector member in its recess for up and down swinging of the said curved edge thereof, said sector members constituting jaws for coaction with the first mentioned jaw to secure a piece of work in position for cutting when the machine is turned on the axis of the shaft with respect to a band saw passing across the peripheries of the plates, spring means constantly urging upward swinging of the sector members, and a lever actuated camming means for forcing said members down against the action of the spring means.

2. A work holding machine of the character stated in claim 1, with a work positioning plate disposed upon the top of the lower one of the first mentioned plates and having a plurality of straight edge facets disposed inwardly from the jaw of the underlying plate, and means disposed beneath the upper one of the said pair of plates providing an upper work positioning stop having a plurality of straight portions each of which is parallel with one of said facets with its outer side in the vertical plane of the underlying facet.

3. A work holding machine of the character stated in claim 1, with means between and adjacent to the upper and lower plates forming positioning stops for locating a piece of work between the bottom plate jaw and a sector member, a plurality of vertical members arranged in a circle around the shaft between the vertically spaced plates and coupling such plates together, a ring disposed horizontally between the plates and supported by said vertical members, said lever actuated camming means including a vertically disposed pin secured to said ring beneath each sector member and extending upwardly through the overlying member, the said lever actuated camming means being pivotally attached to the upper end of the pin, and the said means for urging upward swinging of the sector members comprising coil springs each encircling a pin and interposed between the ring and the underside of a sector member.

4. A work holding apparatus comprising a pair of spaced concentric plates, means for rotatably supporting said plates, one of said plates having work engaging means facing said other plate, said other plate having a plurality of recesses extending inwardly from the peripheral edge toward and from said one plate, the outer edge of each work engaging member forming a continuation of the peripheral edge of said other plate, resilient means for urging said work engaging members away from said one plate and lever actuated camming means for moving said work engaging members toward said one plate against the action of said resilient means whereby work pieces may be clamped between said work engaging means and said work engaging members and upon rotation of said plates said work pieces may be cut by a cutting means disposed tangentially of said plates.

References Cited in the file of this patent

UNITED STATES PATENTS

| Number | Name | Date |
|---|---|---|
| 149,119 | Hatch | Mar. 31, 1874 |
| 405,148 | Dallas | June 11, 1889 |
| 406,225 | Metz | July 2, 1889 |
| 509,534 | Hayne | Nov. 28, 1893 |
| 650,319 | Harland | May 22, 1900 |
| 967,129 | Johnston | Aug. 9, 1910 |
| 1,765,161 | Kaempf et al. | June 17, 1930 |

FOREIGN PATENTS

| Number | Country | Date |
|---|---|---|
| 41,798 | Switzerland | Dec. 4, 1907 |
| 715,350 | France | Sept. 28, 1931 |
| 640,476 | Germany | Jan. 5, 1937 |